(12) United States Patent
Deluca et al.

(10) Patent No.: US 10,937,045 B2
(45) Date of Patent: Mar. 2, 2021

(54) REFERRAL COMPENSATION USING SOCIAL INTERACTIONS

(71) Applicant: International Business Machines Corporation, Armonk, NY (US)

(72) Inventors: Lisa Seacat Deluca, Baltimore, MD (US); Jeremy A. Greenberger, San Jose, CA (US); Zachary Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 434 days.

(21) Appl. No.: 15/876,322

(22) Filed: Jan. 22, 2018

(65) Prior Publication Data
US 2019/0228427 A1    Jul. 25, 2019

(51) Int. Cl.
| | | |
|---|---|---|
| *G06Q 30/02* | (2012.01) | |
| *G06Q 50/00* | (2012.01) | |
| *G06F 16/901* | (2019.01) | |
| *G06N 20/00* | (2019.01) | |

(52) U.S. Cl.
CPC ..... *G06Q 30/0214* (2013.01); *G06F 16/9024* (2019.01); *G06Q 30/0242* (2013.01); *G06Q 30/0277* (2013.01); *G06Q 50/01* (2013.01); *G06N 20/00* (2019.01)

(58) Field of Classification Search
CPC ............ G06Q 30/0214; G06Q 50/01; G06Q 30/0242; G06Q 30/0277; G06F 16/9024; G06N 20/00; G06N 5/022
USPC ..................................................... 705/14.16
See application file for complete search history.

(56) References Cited

U.S. PATENT DOCUMENTS

| | | | |
|---|---|---|---|
| 7,664,726 B2 | 2/2010 | Jain et al. | |
| 8,489,458 B2 | 7/2013 | Reis et al. | |
| 8,781,866 B2 | 7/2014 | Meegart et al. | |
| 9,961,382 B1 * | 5/2018 | Dorner | H04N 21/4722 |
| 2005/0119937 A1 | 6/2005 | Estes | |

(Continued)

FOREIGN PATENT DOCUMENTS

| | | | |
|---|---|---|---|
| KR | 20130012273 A | * | 2/2013 |
| WO | WO 2016/138560 A1 | | 9/2016 |

OTHER PUBLICATIONS

Jenna R. Pieper, Motivating employee referrals: The interactive effects of the referral bonus, perceived risk in referring, and affective commitment, 2017 (Year: 2017).*

(Continued)

*Primary Examiner* — Tarek Elchanti
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The method computer program products, and systems can include, for instance: examining, by machine logic, interactions data specifying attributes of interactions with posted social media promotional content promoting a product, wherein the product is subject to an initiated purchase transaction, and wherein the interactions include interactions by a plurality of users; attributing, by machine logic, referral credit for the purchase transaction to users of the plurality of users based on the examining; and providing one or more output based on the attributing.

20 Claims, 11 Drawing Sheets

(56) References Cited

U.S. PATENT DOCUMENTS

2007/0265921 A1    11/2007  Rempe et al.
2008/0189174 A1    8/2008  Moore
2012/0109728 A1*  5/2012  Sparks ............... G06Q 30/0214
                                                         705/14.16

OTHER PUBLICATIONS

Lobel et al. "Customer Referral Incentives and Social Media" *Management Science, Articles in Advance*, pp. 1-16, ISSN 0025-1909(Print), ISSN 1526-5501(Online), 2016.
Schmitt et al. "Referral Programs and Customer Value" ericstownsendmarketing.com, 2010.

* cited by examiner

REFERRAL COMPENSATION USING SOCIAL INTERACTIONS

BACKGROUND

Data structures have been employed for improving operation of computer system. A data structure refers to an organization of data in a computer environment for improved computer system operation. Data structure types include containers, lists, stacks, queues, and graphs. Data structures have been employed for improved computer system operation e.g. in terms of algorithm efficiency, memory usage efficiency, maintainability, and reliability.

SUMMARY

Shortcomings of the prior art are overcome, and additional advantages are provided, through the provision, in one aspect, of a method. The method can include, for example: examining, by machine logic, interactions data specifying attributes of interactions with posted social media promotional content promoting a product, wherein the product is subject to an initiated purchase transaction, and wherein the interactions include interactions by a plurality of users; attributing, by machine logic, referral credit for the purchase transaction to users of the plurality of users based on the examining; and providing one or more output based on the attributing.

In another aspect, a computer program product can be provided. The computer program product can include a computer readable storage medium readable by one or more processing unit and storing instructions for execution by one or more processor for performing a method. The method can include, for example: examining, by machine logic, interactions data specifying attributes of interactions with posted social media promotional content promoting a product, wherein the product is subject to an initiated purchase transaction, and wherein the interactions include interactions by a plurality of users; attributing, by machine logic, referral credit for the purchase transaction to users of the plurality of users based on the examining; and providing one or more output based on the attributing.

In a further aspect, a system can be provided. The system can include, for example a memory. In addition, the system can include one or more processor in communication with the memory. Further, the system can include program instructions executable by the one or more processor via the memory to perform a method. The method can include, for example: examining, by machine logic, interactions data specifying attributes of interactions with posted social media promotional content promoting a product, wherein the product is subject to an initiated purchase transaction, and wherein the interactions include interactions by a plurality of users; attributing, by machine logic, referral credit for the purchase transaction to users of the plurality of users based on the examining; and providing one or more output based on the attributing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
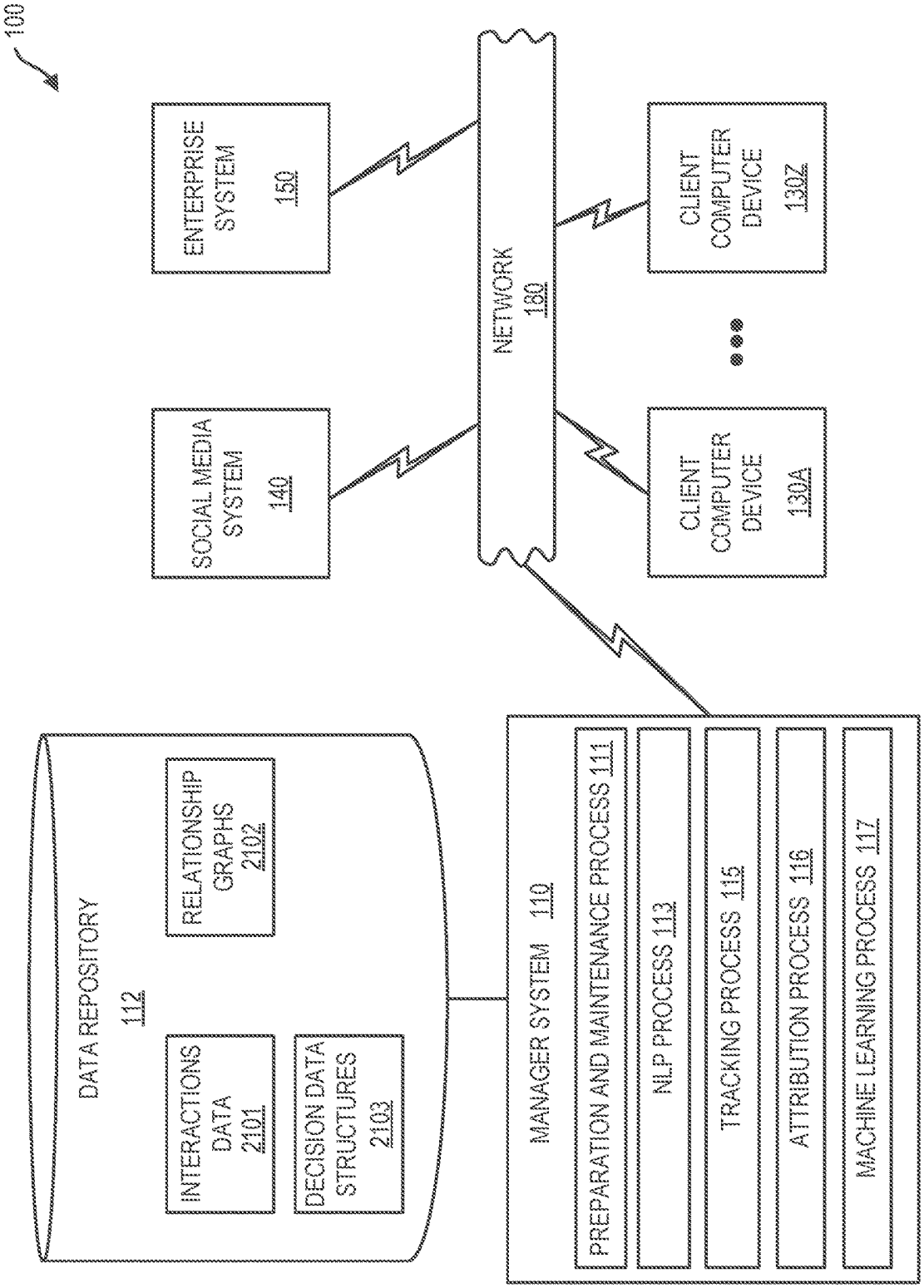
FIG. 1 is a block schematic diagram of a system having a manager system, a plurality of client computer devices, a social media system, and an enterprise system in one embodiment.

System 100 for referral credit attribution is shown in FIG. 1. System 100 can include manager system 110 having an associated data repository 112, client computer devices 130A-130Z, social media system 140, enterprise system 150, which can be connected to and in communication with one another via network 180. Network 180 may be a physical network and/or a virtual network.

Client computer devices 130A-130Z can be in communication with network 180. Each of the different client computer devices 130A-130Z can be associated to a different user. Client computer devices of client computer devices 130A-130Z in one embodiment can be a computer node based devices provided by a client computer, e.g. a mobile device, e.g. a smartphone, tablet, smartwatch, laptop, or PC that runs one or more program, e.g. including a web browser for viewing web pages.

System 100 can include numerous devices which may be computer node based devices connected by network 180. Network 180 may be a physical network and/or a virtual network. A physical network can be, for example, a physical telecommunications network connecting numerous computing nodes or systems, such as computer servers and computer clients. By contrast a virtual network can, for example, combine numerous physical networks or parts thereof into a logical virtual network. In another example, numerous virtual networks can be defined over a single physical network.

In one embodiment manager system 110 can be external to social media system 140 enterprise system 150 and to each of the client computer device 130A-130Z. In one embodiment manager system 110 can be co-located with social media system 140 and/or enterprise system 150. In one embodiment manager system 110 can be co-located with one or more of client computer device 130A-130Z.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computer devices 130A-130Z of participant users of the messaging systems. Messaging systems can also be incorporated in systems that that have minimal or no social network attributes. A messaging system can be provided by a short message system (SMS) text message delivery service of a mobile phone cellular network provider, or an email delivery system.

Manager system 110 can run various processes. For example, manager system 110 can run preparation and maintenance process 111, natural language processing (NLP) process 113, tracking process 115, attribution process 115, and machine learning process 117. Data repository 112 can store in interactions data area 2101 data respecting user interactions with posts specifying product promotions. In relationship graphs area 2102 data repository 112 can store interactions data providing by relationship graph interaction data determined by examination of data of interactions data area 2101. In decision data structures area 2103 data repository 112 can store various decision data structures, such as data structures mapping conditions to artificial intelligence (AI) decisions.

Manager system 110 can run NLP process 113 to process data for preparation of records that are stored in data repository 112 and for other purposes. Manager system 110 can run NLP process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameter can include topic segmentation to identify several topics within a message. Topic analysis can apply a variety of technologies e.g. one or more of Hidden Markov Model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." In one embodiment, determining sentiment can include use of a scaling system whereby words commonly associated with having a negative, neutral or positive sentiment with them are given an associated number on a −10 to +10 scale (most negative up to most positive).

Manager system 110 can run tracking process 115 to examine user interactions with posted content within a social media system 140 and to establish a relationship graphs defining relationship graph interaction data based on the interactions. For example, a first user can post promotional content specifying a promotion of a product and second to Nth users can interact with the posted content. For example, a second user can view the first user's post of the promotional content and/or like the post and/or can share the post, i.e. re-post the promotional content. Thus, the second user can have various levels of interaction from minimal (just viewing) to more involved, e.g. sharing. Third to Nth users can interact with the posted content, e.g. can also view, like, or share the posted content. The third to Nth user's interaction with the promotional content can be with respect to the original post of the posted promotional content or with a re-post thereof (by sharing of the posted content).

Manager system 110 running tracking process 115 can track the status of interactions such as those referenced, namely, views, likes, or shares and can also track post versions to which an interaction relates, i.e. whether an interaction is with respect to an original post, a re-post (shared version of originally posted content), or a shared version of a shared version of an original post (a second tiered hierarchy shared post). Manager system 110 can establish a relationship graph recording such interaction data for later use.

Manager system 110 can run attribution process 116 for attributing referral credit for a user's promotion of a product. Embodiments herein recognize problems with respect to existing programs for providing referral credit to users. For example, a user may be provided according to one method for providing referral credit a promoter referenced link promotion. A promoter referenced link promotion can include a reference to a certain user performing the promotion on behalf of the enterprise. According to referral credit program involving use of a promoter referenced link, the user promoter who receives the promoter referenced link promotion from an enterprise can distribute the promoter referenced link in any manner that the user deems appropriate, i.e. can e-mail the promoter referenced link, post the promoter referenced link on a social media website, and the like. A promotor referenced link promotion can include an active hyperlink activation of which can return a webpage promoting a product of the enterprise. A webpage of the promoter referenced link promotion can include a reference to a promoter (e.g. with an identifier) as well as a user interface area—purchase portal content—facilitating purchase of a promoted product by a third party user other than the user promoter. Accordingly, an enterprise processing a purchase transaction resulting from use of a promoter referenced link promotion and using purchase portal content of the promoter referenced link can discern that the purchase was in dependence on the promoter referenced link promotion and accordingly can attribute referral credit for the purchase to the promoter user referenced in the promoter referenced link.

While the described referral compensation program has advantages and uses, embodiments herein recognize various limitations. For example, the second user who views content of a promoter referenced link promotion may view the content of the promoter referenced link promotion for only a short time and the current view may not result in an immediate purchase. However, some time later the second user may initiate a session to the enterprise's website to purchase a product referenced in the promoter referenced link promotion but using purchase portal content other than purchase portal content of the promoter referenced link. In such a scenario, the user is not allocated referral credit because the second user failed to use purchase portal content of the promoter referenced link promotion when making a purchase. The enterprise does not associate the user referenced in the promoter referenced link promotion to the purchase and accordingly does not attribute any referral credit to the user referenced in the promoter referenced link promotion.

Manager system 110 running attribution process 116 can use one or more decision data structure of decision data structures area 2103 for performance of attribution. Different users can be allocated different scoring values on a scoring scale depending on their interactions with a promotional post.

According to one embodiment a promotional post used in system 100 can be a generic post that is not a promoter referenced link promotion and which, unlike a promoter referenced link promotion is without a reference to a promoter user. Manager system 110 in one embodiment is configured so that a promoter can promote a product using a generic promotional post without a promoter referenced link promotion, and yet still receive compensation credit for posting the promotional post. Other users can be attributed credit as well in dependence on their interactions on the post which can be a generic post as set forth herein. Importantly, while embodiments herein provide referral credit where users interact with generic posts, manager system 110 can be configured to process interactions involving generic posts and also posts having content of a promoter referenced link promotion.

A decision data structure that can be stored in decision data structures area 2103 of data repository 112 can have various features. An interaction to scoring value allocation mapping decision data structure can include various features such as features wherein different scoring values (points) are allocated for different types of interaction, e.g. viewing, liking, or sharing and wherein scoring values can be scaled based on a known node separation distance which can be determined using an established relationship graph as set forth herein. For example, scoring values for post interactions having longer node separation distances from a purchase interface can be scaled downward relative to scoring values for post interactions closer to purchase interface.

Manager system 110 can allocate referral credit compensation based on a determined referral credit allocation. Referral credit compensation allocated by manager system 110 can take on a variety of forms, e.g. can include digital rights compensation and/or monetary account compensation.

Manager system 110 can run machine learning process 117 to iteratively update by machine learning the reliability and accuracy of determinations performed using system 100. Manager system 110 running machine learning process 117 in one embodiment can iteratively examine performance of manager system 110 across a distribution of instances of manager system 110 performing attributions, wherein each instance employs differently configured decision data structure (e.g. having different parameter values that are varied within a valid range) for driving an attribution decision. Based on a result of monitoring of different instances over time, manager system 110 running machine learning process 117 can bias the variety of the decision data structures employed, so that decision data structures subsequently used in subsequent iterations have parameter values that assume the characteristics of the most successfully performing decision data structures.

Figure 2:
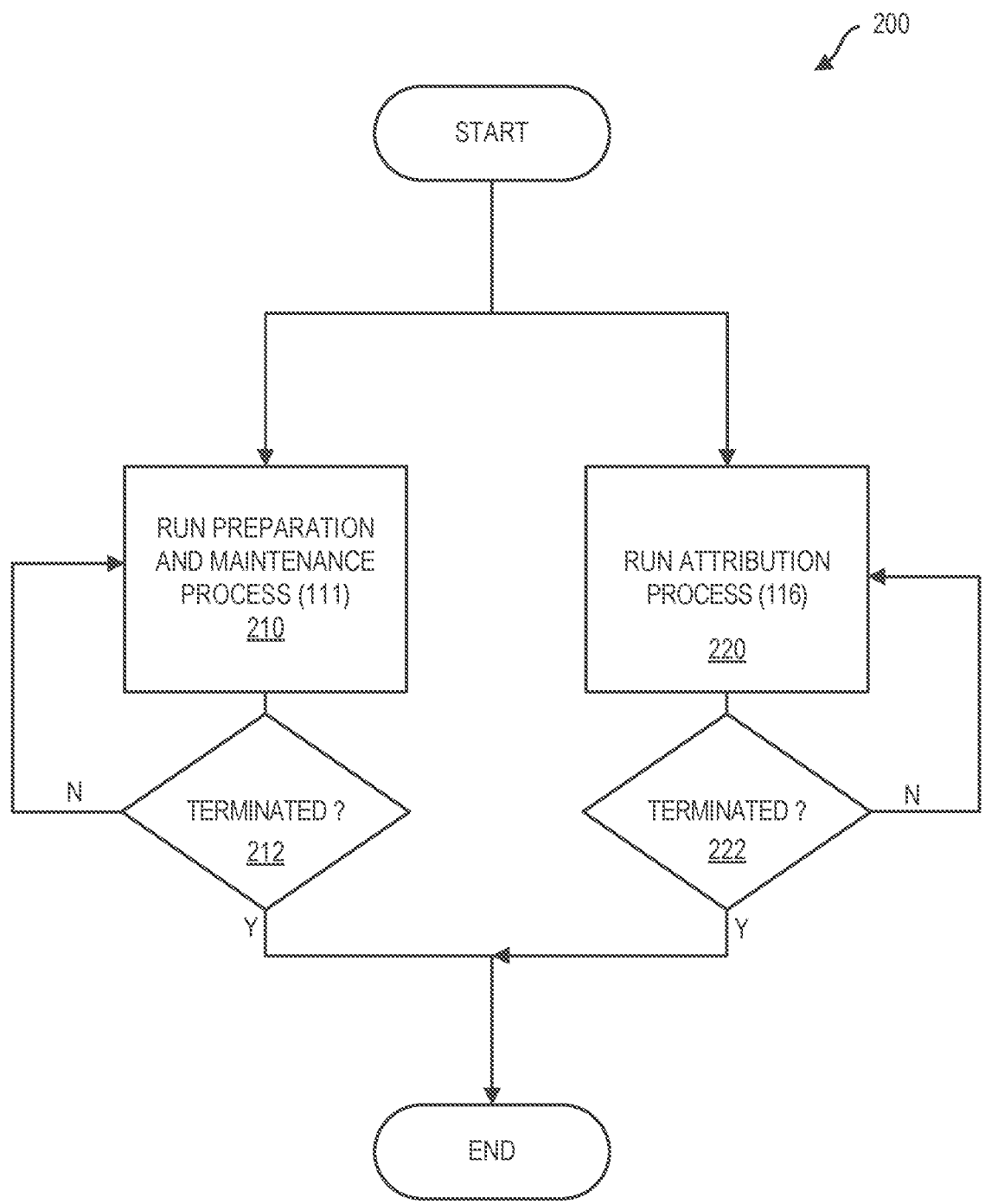
FIG. 2 is a flowchart depicting performance of a method by a manager system according to one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of interactions data area 2101, relationship graphs area 2102, and decision data structures area 2103. Manager system 110 can run preparation and maintenance process 111 until process 111 is terminated at block 212.

At block 220, manager system 110 can run attribution process 116 to attribute referral credit to a purchase transaction. Manager system 110 can run preparation and maintenance process 111 and attribution process 116 concurrently and can run each of process 111 and process 116 iteratively. Manager system 110 can run attribution process 116 until process 116 is terminated at block 222.

Figure 3:
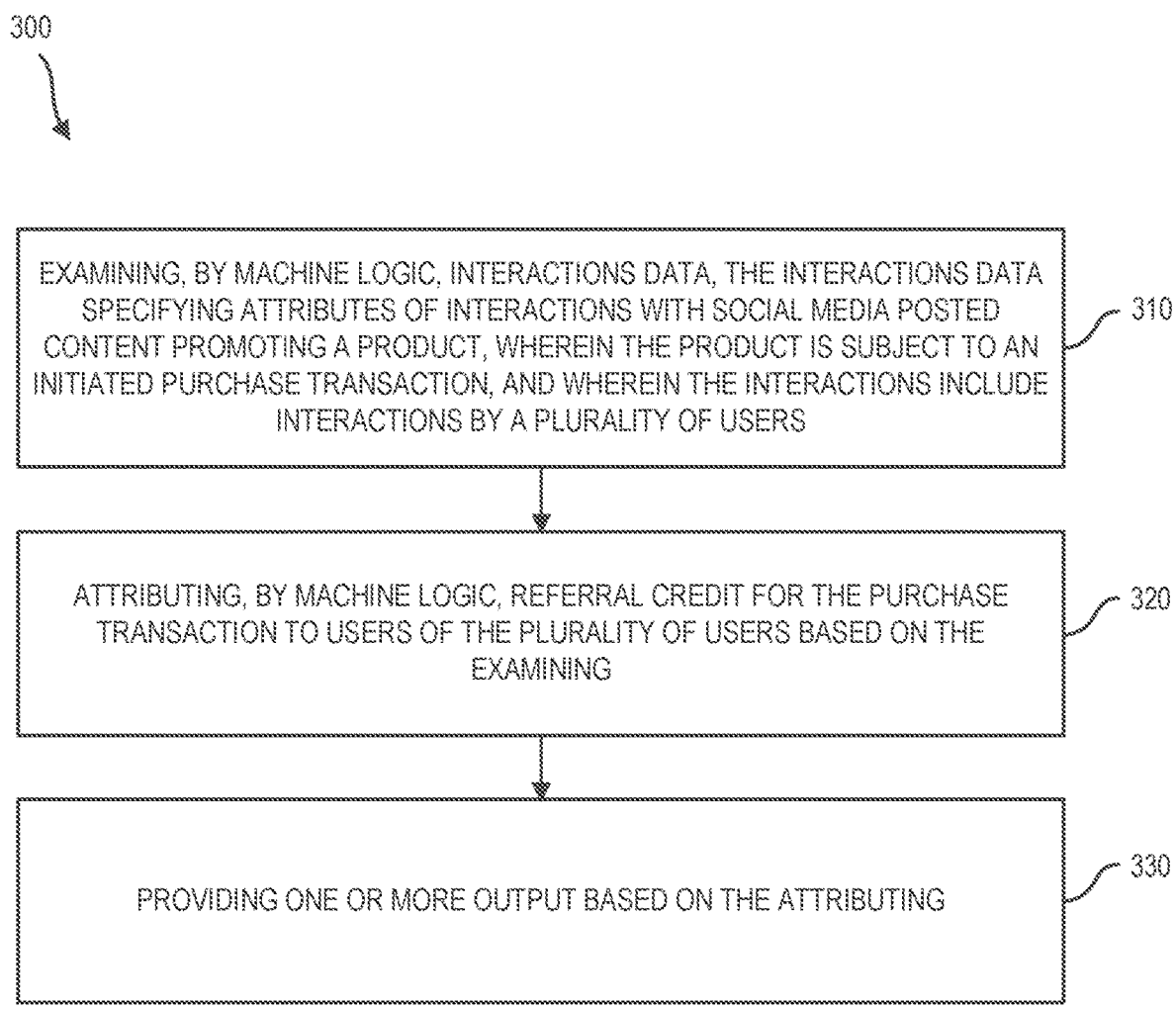
FIG. 3 is a flowchart depicting a method for performance of a manager system according to one embodiment.

A method 300 for performance by manager system 110 in one embodiment with reference to the flowchart of FIG. 3. At block 310 manager system 110 can perform examining, by machine logic, interactions data specifying attributes of interactions with posted social media promotional content promoting a product, wherein the product is subject to an initiated purchase transaction, and wherein the interactions include interactions by a plurality of users. At block 320 manager system 110 can perform attributing, by machine logic, referral credit for the purchase transaction to users of the plurality of users based on the examining. At block 330 manager system 110 can perform providing one or more output based on the attributing.

Figure 4:
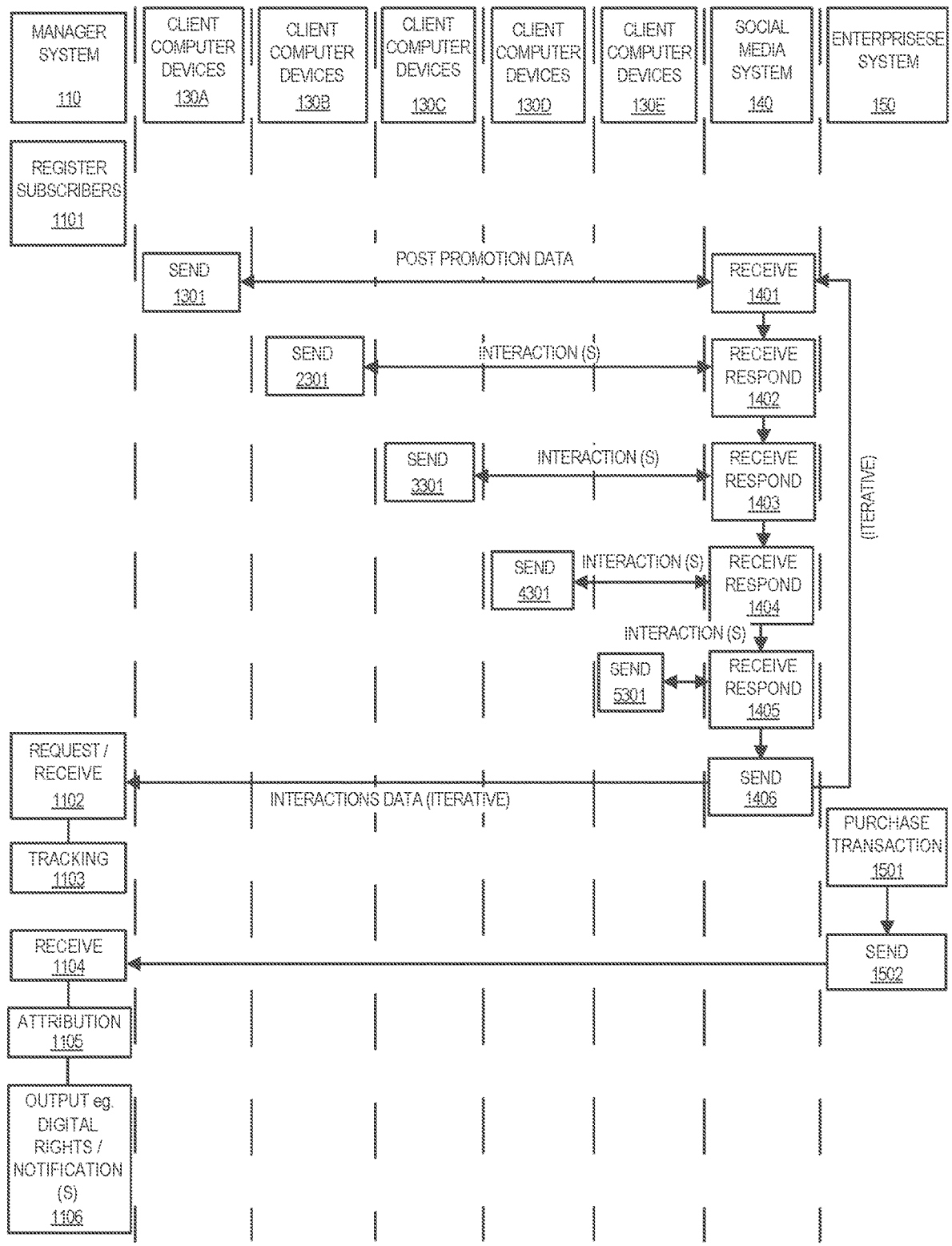
FIG. 4 is a flowchart depicting a method for performance of a manager system in one embodiment interoperating with other computing node based devices and systems according to one embodiment.

A specific example of method 300 as performed by manager system 110 interoperating with various other computing node based devices and systems, such as client computer devices of client computer devices 130A-130Z, social media system 140, and enterprise system 150 is set forth in reference to the flowchart of FIG. 4.

At block 1101, manager system 110 can register subscribers to a service provided by manager system 110, wherein manager system 110 makes available promotional content to subscriber users, wherein the users can use the promotional content to promote one or more product and receive referral credit for purchases resulting from their promotional efforts. In the example described with reference to FIG. 4, users of client computer devices 130A-130E can register as subscriber users of a promotions service provided by manager system 110, wherein the subscriber users can receive referral credit.

While embodiments herein describe scenarios wherein all users interacting with promotional content are subscriber users, it will be understood that system 100 can also be configured so that interactions with promotional content need not involve interactions by subscriber users of a referral credit service, but can also involve for example interactions with non-subscribers, i.e. users who are not subscribers of a referral credit service but who may be users of social media system 140 that facilitates services of a referral credit service provided by manager system 110.

Figure 5:
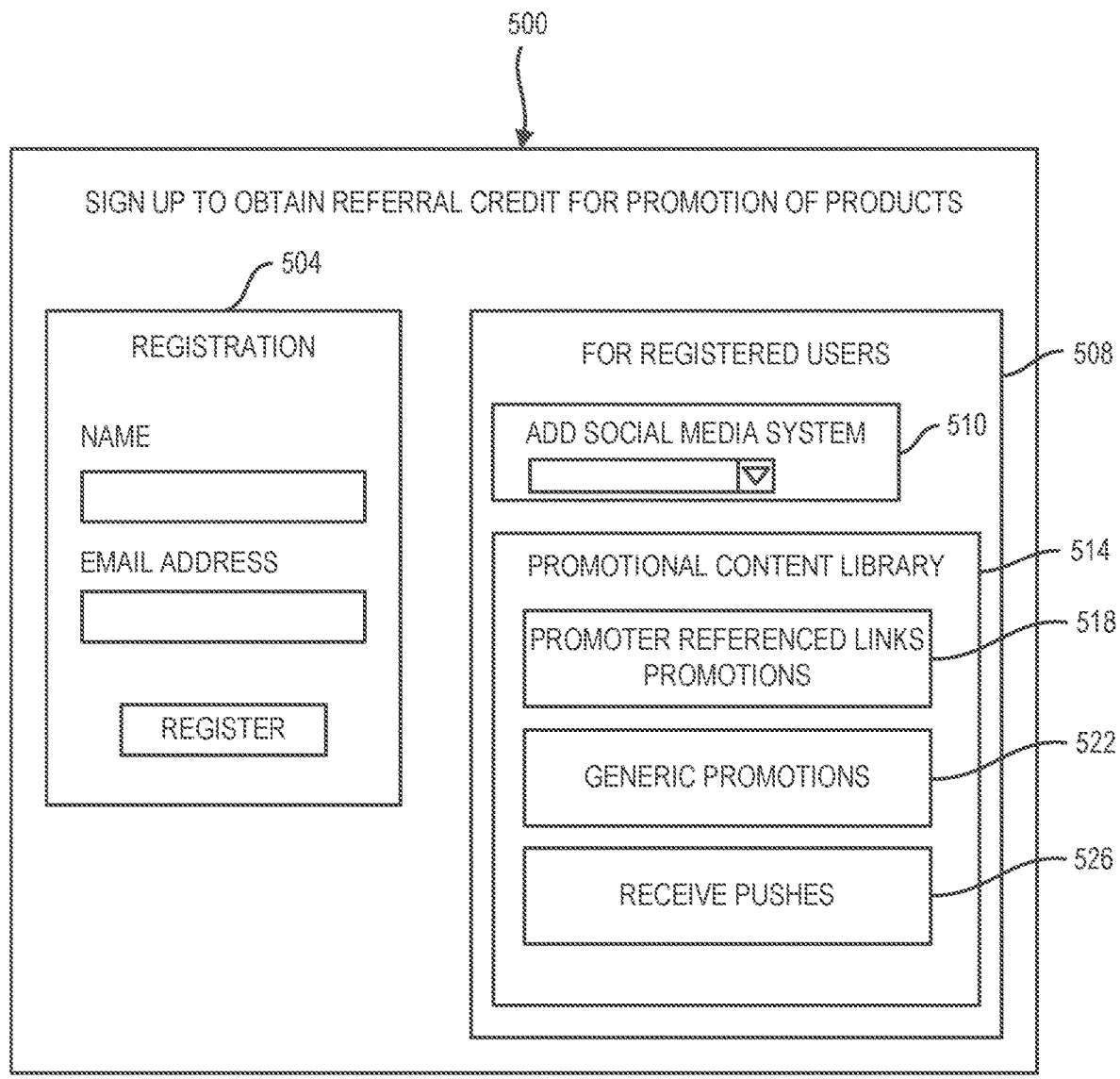
FIG. 5 depicts a user interface for display on a display of a client computer device according to one embodiment.

According to one embodiment, users can subscribe to a referral credit service using a user interface such as user interface 500, illustrated in FIG. 5. FIG. 5 depicts a user interface 500 that can be displayed on a display of client computer devices 130A-130Z. User interface 500 can be a manually operated user interface for display on a display of a client computer device of client computer devices 130A-130Z. User interface 500 in one embodiment can be a served webpage served by manager system 110 which provides a promotional referral credit service, wherein users can receive referral credit for promotions involving products. The products can be for example, products provided by one single enterprise, or in one embodiment multiple enterprises in the case manager system 110 provides its promotional referral credit service for the benefit of multiple users and multiple enterprises. Products that are subject to promotions herein can be, e.g. physical and tangible products, e.g. widgets or can be e.g. services products including entertainment event service products (game or concert tickets for example) or professional services products, e.g. real estate brokerage services, accounting services, legal services and the like.

User interface 500 can include registration area 504, allowing new users to register with the promotional referral credit service e.g. provided by manager system 110. Area 506 of user interface 500 can provide options for registered users of the promotional referral credit service provided by manager system 110. Using area 510, a user can add or drop social media systems in which the referral credit service can be active. Using registration area 504 a registered subscriber user can select options for promotional content, for which the subscriber user will use to promote a product. Using area 518, a user can select an option to obtain one or more promoter referenced link promotions for use by the user.

Figure 6:
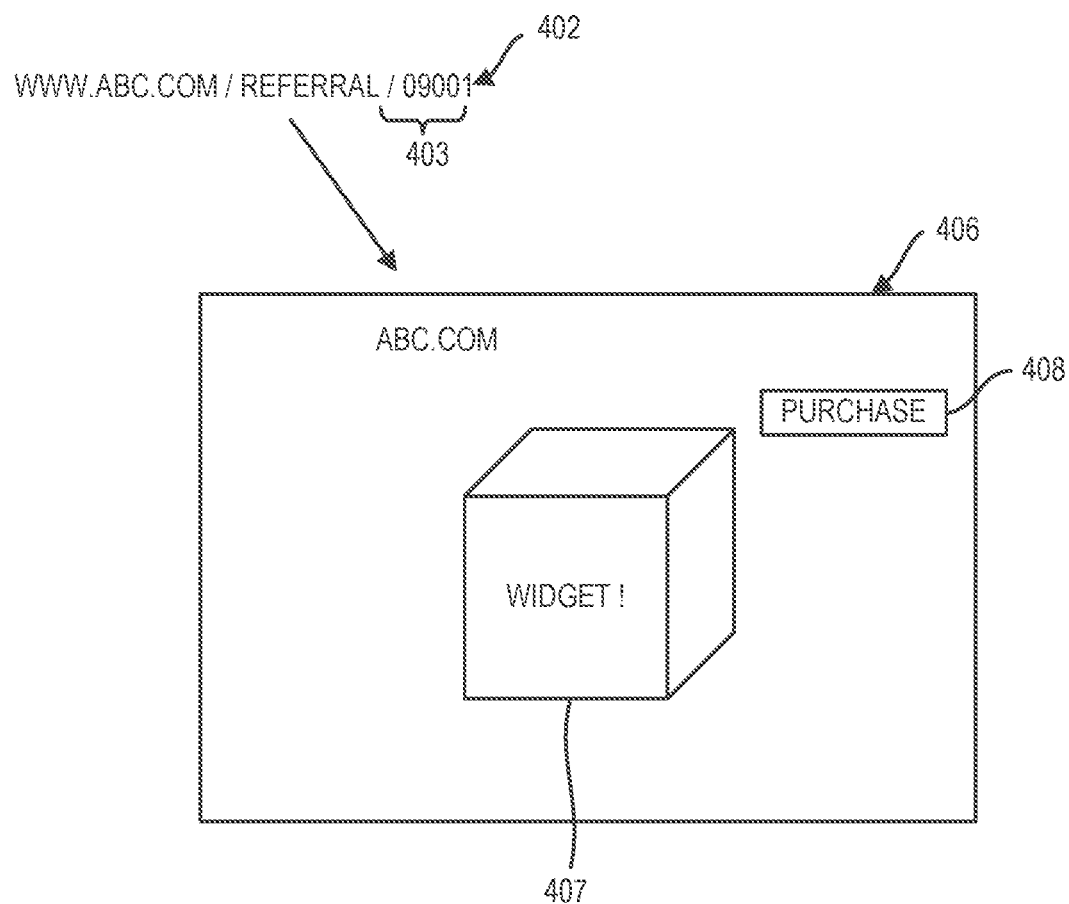
FIG. 6 depicts a promoter referenced link promotion according to one embodiment.

A promoter referenced link promotion can have attributes as are described in reference to FIG. 6. A promoter referenced link promotion can include a universal resource locator (URL) 402. URL 402 can include a promoter reference 403, which can be a unique identifier identifying the promoter user who uses the promoter referenced link promotion to promote a product. A promoter referenced link promotion, in addition to including URL 402, having a promoter reference 403 can include an associated webpage 406 that is served by a server e.g. of enterprise system 150 in response to a browser processing of URL 402. Webpage 406 can include product promotion content 407 highlighting, e.g. describing, illustrating (a product) and purchase portal content 408 facilitating purchase of the promoted product. A promoter user herein can be e.g. a promoter user human individual acting in an individual capacity or a promoter user human individual acting as an agent of an enterprise entity.

Referring further to user interface 500 of FIG. 5, a user using area 522 can enter configuration data so that the user can obtain generic promotions, which it can use e.g. by posting content of the generic promotions onto social media system 140 to receive referral credit on purchases of a product specified in the generic promotions. A generic promotion in one embodiment can have content similar to content of a promoter referenced link promotion, but the content in some embodiments can be defeatured relative to content of a promoter referenced link promotion.

Referring to FIG. 6 for example, a generic promotion can have content according to the content depicted in FIG. 6, but one or more feature can be removed. For example, a generic promotion can have a URL, such as URL 402 and a webpage 406 with a distinction being that in the generic promotion URL 402 is absent of the promoter reference 403 referencing the promoter who is using the promotion for purposes of receiving referral credit. In another embodiment, a generic promotion can have the content depicted in FIG. 6, but can be absent of URL 402 and can be provided by a page according to webpage 406, but the page can be independent of any URL. In such an embodiment, the page according to webpage 406 is not a webpage served by a server and viewed through a browser but can include for example, a simple image file in an image file format with or without active links such as a purchase portal content 408. In another embodiment, purchase portal content 408 can be deleted altogether. Purchase portal content 408 in one embodiment can include e.g. hyperlink to an online store and in one embodiment can include data entry fields to facilitate purchase of the product depicted in product promotion area 407.

Referring to the flowchart of FIG. 4, client computer device 130A at block 1301 based on configuration data entered by the user of client computer device 130A, can initiate a post by sending post data indicating post information to social media system 140. On receipt of the post data at block 1401, social media system 140 completes the user initiated post. At block 1301, the user of client computer device 130A can initiate posting of promotional content having features explained with reference to FIG. 6, e.g. which can include the content features depicted in FIG. 6, in some cases with one or more of URL feature 402, promoter reference feature 403 and/or purchase portal content 408 deleted. That is, the posted content subject to posting at block 1301 can be promotional content provided by a promoter referenced link promotion or can be a generic promotion having features of a generic promotion as set forth herein.

At blocks 2301, 3301, 4301, and 5301 the respective users of client computer devices 130B-130E can perform various interactions with the post initiated at block 1301 and posted at block 1401 by social media system 140. The interactions at blocks 2301, 3301, 4301, and 5301 can be responded to by social media system 140 at receive/respond blocks 1402, 1403, 1404, 1405 respectively. The interactions can take on various forms and can include for example, viewing posted promotional content, liking posted promotional content, and/or sharing posted promotional content. Further, the interactions can be performed with respect to original posted content, e.g. posted content posted at block 1401 in response to a post initiated by the user of client computer device 130A, or the interactions can be performed with respect to shared posted content, wherein a viewer of a first user's post reposts the post by sharing the posted content.

At block 1406, social media system 140 can iteratively send interactions data specifying interactions by the users of client computer devices 130A-130E with respect to the post initiated at block 1301 for receipt by manager system 110 at block 1102. At block 1102, manager system 110 can iteratively receive the interactions data iteratively sent at block 1406. Using the iteratively received interactions data, iteratively received at block 1102, manager system 110 at block 1103 can perform tracking of the interaction specified by the interactions data. Manager system 110 performing tracking at block 1103 can include manager system 110 tracking the interactions to establish a relationship graph, an example of which is depicted in FIG. 7.

Figure 7:
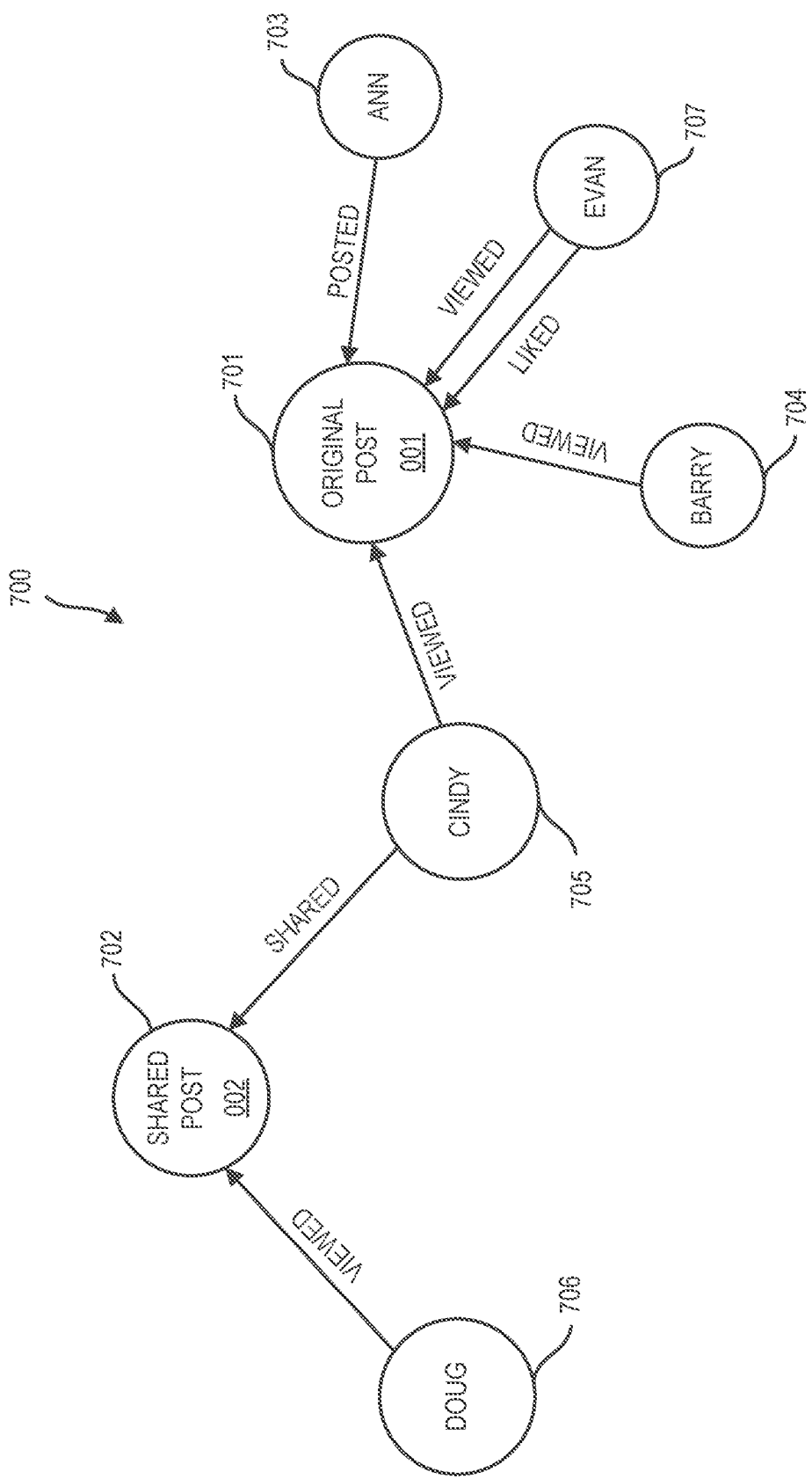
FIG. 7 depicts a relationship graph that can be established by manager system according to one embodiment.

FIG. 7 depicts a relationship graph 700 in one embodiment which manager system 110 can establish based on a tracking of interactions data iteratively received at block 1102 and specifying interactions in the described scenario wherein the user of client computer device 130A initiates posting of original posted promotional content and the users of client computer devices 130B-130E interact with posted promotional content subject to post initiation by the user of client computer device 130A. In the example described with reference to relationship graph 700, depicted in FIG. 7, Ann is the user of client computer device 130A, Barry is the user of client computer device 130B, Cindy is the user of client computer device 130C, Doug is the user of client computer device 130D, and Evan is the user of client computer device 130E. Based on the tracking of received interaction data, manager system 110 at block 1103 can establish the relationship graph 700 as depicted in FIG. 7. According to the relationship graph 700 of FIG. 7, nodes can include post nodes such as post node 701 and post node 702 and user nodes such as user nodes 703-707. An edge between a user node and a post node can depict the user's interaction with a post. For example, the "viewed" arrow from "Evan" user node 707 to post node 701 indicates that Evan viewed the post specified in post node 701. For example, the "liked" arrow from "Evan" user node 707 to post node 701 indicates that Evan liked the post specified in post node 701. The "shared" arrow from "Cindy" user node 705 to post node 702 indicates that Cindy shared the post specified in post node 702. Manager system 110 can establish relationship graph 700 so that when a user shares a post, that interaction results in a new post node being instantiated in relationship graph 700. For example, when Cindy shares the post indicated by post node 701 that interaction results in post node 702 being instantiated.

The providing of relationship graph 700 facilitates lightweight storage and low overhead access of interactions data. Referring to the data structuring performed in the establishing of relationship graph 700, it is noted that manager system 110 can iteratively add to relationship graph 700 on an iterative basis as new interactions data is iteratively received at block 1102.

Use of relationship graph 700 can provide structuring of interactions data which, in some embodiments, can be received in unstructured form or of a lesser structured form. The use of relationship graph 700 can provide significant technical computing advantages. Namely, relationship graph 700 reduce a count of data queries as well as data storage provisions which may otherwise be necessary. The transformation of interactions data into a structured form indicated by the data structure of relationship graph 700 can facilitate in the discarding of unused interactions data to reduce data storage requirements to increase data acquisition and processing speeds.

Various relationships are depicted in relationship graph 700, as shown in FIG. 7. In the scenario depicted with relationship graph 700, Ann (node 703) initiates an original post (node 701), Barry (node 704) can view the original post (node 701), Cindy (node 705) can view the original post (node 701) and can share the original post (node 701). Cindy's shared post (repost) is indicated by newly instantiated post node 702. Doug (node 706) can view Cindy's shared post (node 702). Evan (node 707) can view Ann's original post (node 701) and can also like Ann's post (node 701). Various node specifiers in addition to the content shown can include timestamps. In the scenario depicted, the actions described can be performed in the succession according to the description. Namely, Ann's original post first, Barry's viewing second, Cindy's viewing and sharing third and fourth, Doug's viewing fifth, and Evan's viewing and liking sixth and seventh. Relationship graph 700 can record the sequence information by appropriate timestamping.

At block 1501, enterprise system 150 which can be an enterprise providing a product subject to a promotion referenced in the posted content posted in block 1501 can process an initiated purchase transaction. In the described scenario, a purchase transaction can be initiated by one or more user, e.g. from the set of users in the described example of Barry, Cindy, Doug, or Evan using the respective client computer devices 130B-130E.

Based on purchase transaction being initiated, enterprise system 150 at block 1502 can send a communication for receipt by manager system 110 at block 1104. The communication received at block 1104 can be a communication indicating that a certain user of social media system 140 has initiated a purchase transaction. In the described scenario, manager system 110 can be providing a service that benefits referral credit candidate users, such as users Ann though Evan, of client computer devices 130A-130E, and which also benefits enterprise system 150 which is promoting products and completing purchase transactions in relation to products. Based on receipt of a communication that a purchase transaction has been initiated by a certain user, manager system 110 at block 1104 can examine relationship graphs area 2102 to identify any relationship graphs referencing social media interactions of the certain user involving promotional content specifying the product subject to the initiated purchase transaction. Manager system 110 can then use any identified relationship graph of relationship graphs area 2102 to perform an attribution.

Manager system 110 at block 1105 can perform a referral credit attribution for the initiated purchase transaction processed by enterprise system 150 at block 1501. Performing referral credit attribution at block 1105, manager system 110 can use a decision logic data structure, such as a decision logic data structure having characteristics as set forth in reference to Table 1.

TABLE 1

| Classification | Points (Actor) | Points (Recipient) | Node Distance Scaling Factor |
| --- | --- | --- | --- |
| Original Posting | 10 | — | — |
| View | 1 | 1 | 0.5 per node |
| Like | 2 | 3 | 0.5 per node |
| Share | 5 | 4 | 0.5 per node |
| Purchase Portal | — | 6 | — |

Table 1 is a decision logic data structure that maps user interactions with a social media posts involving product promotional content to scoring factors associated with the various interactions. In the first column of Table 1 there is set forth a variety of classifications of interactions such as an original posting interaction, a view interaction, a like interaction, a share interaction, and a purchase interaction. Interactions can have associated actors and recipients. For examples, in respect to a view the actor in a view is the user performing the view and the recipient of the view is the user whose posted content is viewed. Set forth in Table 1, scoring values can be allocated both to actors and recipients. Referring to the node distance scaling factor of Table 1, it may be advantageous to scale the scoring based on relationship proximity to a transaction. For example, in respect to the relationship graph set forth in reference to FIG. 7, in the case that Doug is the user initiating a purchase transaction, post node 702 may be determined to be the primary node and node 701 can be determined to be the secondary node. Contribution scoring for interactions in relation to the secondary node 701 can be scaled downward relative to interactions in relation to the primary node 702. For determining a primary node of relationship graph 700 associated to a purchase transaction, manager system 110 can identify the post node interacted with by the purchasing user prior to initiating the purchase transaction (whether the purchasing user interacted with the original post content of post node 701 or the shared version post content of post node 702). In some cases (but not all cases) the purchasing user will have initiated the purchase transaction using purchase portal content of post content that is specified in a post node (a user can use purchase portal content such as purchase portal content 408 as described in connection with FIG. 6 of the original post or the shared pose to initiate a purchase transaction or can use other purchase portal content independent of any social interactions depicted in relationship graph 700).

Operation of the decision data structure set forth in Table 1 is described further in reference to the examples set forth in Table 2 and 3 herein under various purchase scenarios. Table 2 describes exemplary scoring value allocation using the decision data structure of Table 1. In the scenario depicted in Table 2, Doug is the purchasing user who has initiated a purchase transaction and has used purchase portal content facilitated by Cindy's shared posted content, e.g. with use of a user interface area such as purchase portal content 408 depicted in FIG. 6. Possible scoring values allocation is set forth in Table 2.

TABLE 2

| User | Raw Points (Actor) | Raw Points (Recipient) | Aggregate Points | Points (After Scaling) |
|---|---|---|---|---|
| Ann | 10 (Original Post) | 1 + 1 + 4 + 1 + 3 = 10 | 20 | 10 |
| Barry | 1 | — | — | 0.5 |
| Cindy | 1 + 5 = 6 | 1 + 6 = 7 | 13 | 13 |
| Doug (Purchaser) | — | — | — | — |
| Evan | 1 + 2 = 3 | — | — | 1.5 |

As seen in Table 2, only Ann and Cindy are eligible to receive recipient point scoring values as Ann and Cindy are the only users to have posted promotional content, i.e. Ann with the original posting initiation and Cindy by initiating a shared content posting. Referring to recipient raw points, Ann according to the decision data structure of Table 1, can receive 1 point for Barry's view, 1 point for Cindy's view, 4 points for Cindy's share, 1 point for Evan's view, and 3 points for Evan's like; for a total of twenty (20) aggregate raw points. Regarding Cindy's recipient raw points, Cindy can receive 1 point for Doug's view and 6 points for Doug's use of purchase portal content of Cindy's shared content in initiating a purchase transaction. Regarding actor raw points, Ann can receive 10 raw points for the original post, Barry can receive 1 raw actor point for Barry's view, Cindy can receive 1 point for Cindy's view and 5 points for Cindy's share. Doug as the purchaser and by rule can be exempted from receiving any points, and Evan can receive 1 point for Evan's view and 2 points for Evan's like.

Manager system 110 at block 1105 can scale the points using the scaling factor set forth in the decision data structure of Table 1. According to the decision data structure as set forth in Table 1, the points allocated to Ann, Barry, and Evan can be scaled downward based on the separation of post node 701, relative to post node 702 which specifies the post having content through which the purchase transaction was initiated (based on Doug's interaction being with the posted content of post node 702 using purchase portal content such as purchase portal content 408 described in connection with FIG. 6). By rule, Cindy's score can be exempted from downward scaling by virtue of Cindy having posted the content through which the purchase transaction was initiated.

Another scenario is depicted in Table 3.

TABLE 3

| User | Raw Points (Actor) | Raw Points (Recipient) | Aggregate Points | Points (After Scaling) |
|---|---|---|---|---|
| Ann | 10 | 1 + 1 + 4 + 1 + 3 = 10 | 20 | 20 |
| Barry (Purchaser) | — | — | — | — |
| Cindy | 1 + 5 = 6 | 1 | 7 | 3.5 |
| Doug | 1 | — | — | — |
| Evan | 1 + 2 = 3 | — | 3 | 3 |

Barry is the user initiating the purchase and in the scenario depicted in Table 3, and Barry's purchase is independent of use of purchase portal content of Ann's posted content. Table 3 illustrates the feature that manager system 110 can perform an allocation even where a user initiates a purchase transaction using purchase portal content independent of a promoter's posted content. This may be the case where a user views a promoter user's content, is interested in a product, but initiates a purchase transaction sometime later using purchase portal content other than purchase portal content of the promoter user's posted content.

In the described scenario, Ann and Cindy once again are the only users eligible to receive recipient raw points as they are the only users to have posted promotional content. Regarding recipient raw points, Ann can receive 1 point for Barry's view, 1 point for Cindy's view, 4 points for Cindy's share, 1 point for Evan's view, and 3 points for Evan's like. Regarding recipient raw points, Cindy can receive 1 point for Doug's view. Regarding actor raw points, Ann can be allocated 10 points for Ann's original post, Cindy can receive 1 point for Cindy's view of Ann's post and 5 points for sharing Ann's post, Doug can receive 1 point for Doug's view of Cindy's post, and Evan can receive 1 point for Evan's view of Ann's post and 2 points for Evan's like of Ann's post. Barry as the purchaser can be exempted from receiving any points allocation.

Regarding scaling of the received points, in the described scenario of Table 3, manager system 110 can determine that post node 701 is the primary node in relation to the purchase transaction based on the determination that Barry, the purchaser, interacted with the post of post node 701, and not the post of post node 702. Based on the node separation scaling factor, manager system 110 can scale Cindy's score based on the scaling factor down to 3.5 from 7 and can scale Doug's score down to 0.5 from the pre-scaled value of 1. The scores of Ann and Evan remain unchanged as their interactions involved the primary node, i.e. post node 701 and the purchase transaction depicted in Table 3. It will be seen that with further node separation, further scaling will occur by the operation of the scaling factor, e.g. according to the decision logic structure of Table 1, scaling down by a factor of ½ for each node in a node separation. The scores for interactions involving a tertiary node can be allocated scaled points that are a factor of 0.25 of the score that would have been allocated had the interactions involved the primary node according to the particular scoring logic depicted in the decision data structure of Table 1.

In the example of Table 3, it is seen that no recipient points are allocated based on use of a purchase portal content of posted promotional content. That is because, as noted in this scenario depicted in Table 3, Barry has initiated a purchase independent of use of purchase portal content of Ann's posted promotional content.

On completion of attribution at block 1105, manager system 110 can proceed to block 1106 to provide one or more output based on the attribution performed at block 1105. The one or more output can include, e.g. one or more output to adjust digital rights of users interacting with posted promotional content and/or notifications to users interacting with the posted content. The one or more output at block 1106 can also include one or more output to adjust monetary account balances based on the attribution performed at block 1105.

Regarding digital rights that may be subject to adjusting at block 1106, manager system 110 social media system 140 and/or enterprise system 150 may have available a wide range of digital content available to users. Such content can include, e.g. entertainment content, software services content, and/or information content. One or more output provided at block 1106 can include one or more output to adjust user's digital rights in relation to such content based on an attribution performed at block 1105.

One or more output at block 1106 can include a notification output to one or more users notifying the one or more users as to a result of the attribution performed at block 1105. The notification can be a text based notification specifying such information, e.g. that a monetary account balance of a recipient user has been adjusted and/or that there has been an adjustment to digital rights, i.e. that the user after the allocation now has digital rights to a wider range of content offered by one or more of e.g. manager system 110, social media system 140, and/or enterprise system 150 involving, e.g. entertainment content, information content, or software service content. The notification can be text based notification sent using a messaging service of social media system 140.

In some embodiments, manager system 110 can perform attribution at block 1105 in a manner that varies depending on conditions of a purchase transaction. For example, in reference to Tables 2 and 3, it was noted that with respect that some purchase transactions service by manager system 110 can include a purchasing user initiating purchase using purchase portal content of posted product promotional content of promoter user, whereas other purchase transactions can be initiated without use of purchase portal content within posted promotional content of a promoter user.

In one embodiment, manager system 110 can scale the overall benefit allocation resulting from an attribution based on whether purchase portal content within content posted by a promoter user was used to initiate a purchase transaction. For example, manager system 110 may allocate one dollar ($1.00) of total credit in the case that a purchase transaction is initiated with use of purchase portal content such as purchase portal content 408 depicted in FIG. 6 within posted product promotional content of a promoter user and can allocate a total of fifty cents ($0.50) of referral credit in the case a purchase transaction is initiated independent of purchase portal content within posted content of a promoter user. In the described example, where credit allocation is performed by allocation of digital rights and not monetary account balances, allocation of digital rights units (expressed, e.g. in terms of time or content) can be scaled accordingly. The points (after scaling) as depicted in Tables 2 and 3 can be used to determine any credit allocation, e.g. the credit allocation in terms of monetary account balanced and/or or digital rights units can be provided on a prorated basis according to the scoring allocation, e.g. as depicted in the examples of Tables 2 or 3.

In one embodiment, manager system 110 can be configured to provide referral credit attribution and allocation with respect to a wide range of different types of promotional content. As set forth herein, in reference to user interface 500 of FIG. 5, system 100 can be configured for use with promoter referenced link promotional content and generic promotional content (differences in these types of content are described herein with reference to FIG. 6). Promoter referenced link promotional content can include a URL 402 having a promoter reference 403 to a certain promoter user who will perform promoting using the promoter referenced link promotion and an associated webpage 406 served by a resource that can be specified by the URL 402. Webpage 406 can include purchase portal content 408 as set forth herein in connection with FIG. 6. Generic promotional content on the other hand can include one or more of the following items removed: the promoter reference 403, URL 402, and/or purchase portal content 408 as set forth in connection with FIG. 6.

Figure 8:
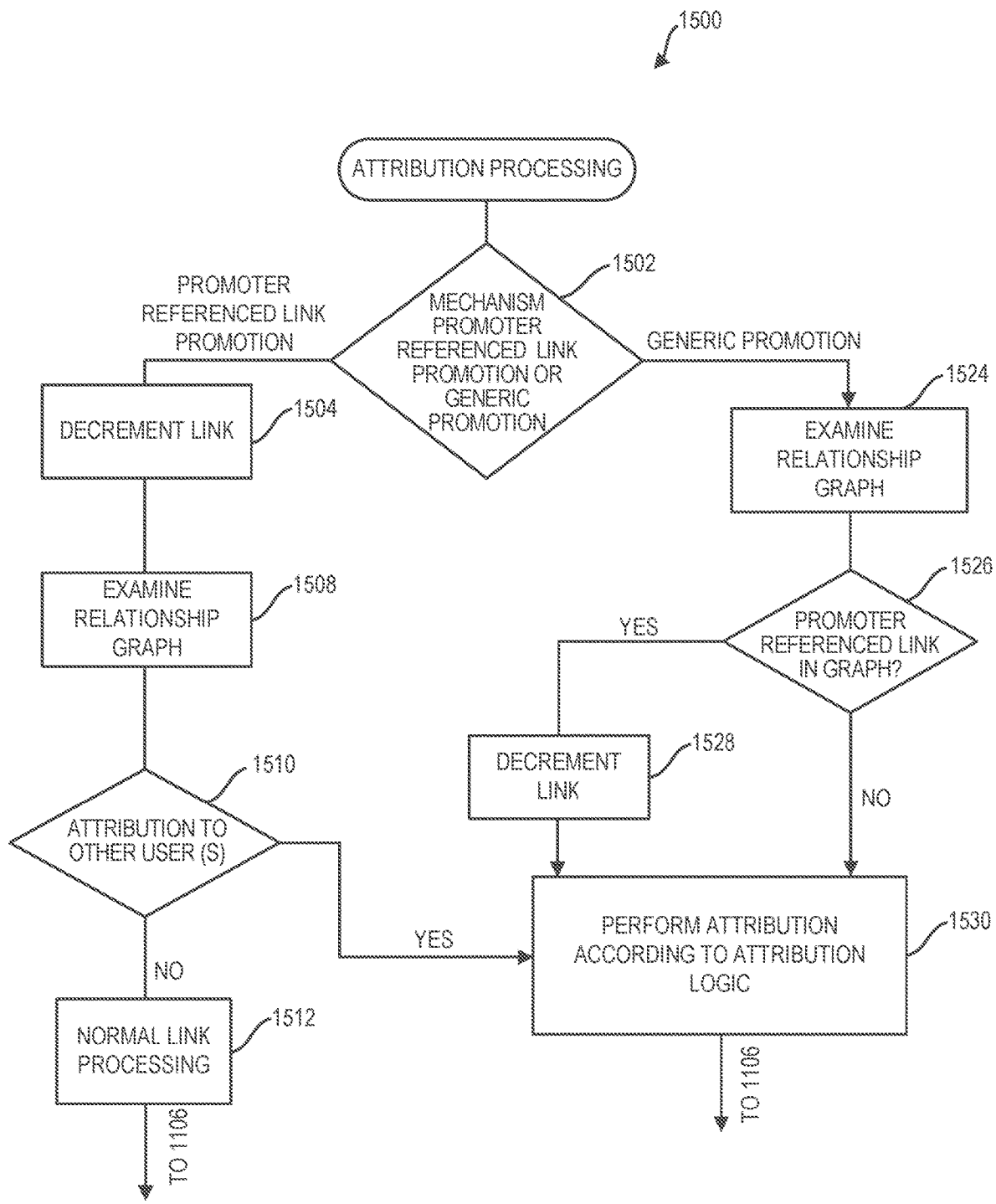
FIG. 8 depicts a method for performance by a manager system according to one embodiment.

FIG. 8 depicts machine logic by which manager system 110 can perform referral credit attribution irrespective of a type of promotion content. At block 1502 manager system 110 can examine data specifying the purchase portal content used to initiate a current purchase transaction. The purchase portal content can be e.g. purchase portal content of a social media post that has been posted by a promoter user for referral credit, or the purchase portal content can be independent of a social media post that has been posted by a user for referral credit (the situation where a user views a post with promotional content and later uses purchase portal content independent of that post to initiate a purchase transaction). Where the purchase portal content is a purchase portal content of a social media product promotion post, the purchase portal content can be purchase portal content of a promoter referenced link promotion or of a generic promotion.

At block 1502 manager system 110 can determine whether the current purchase transaction was initiated using purchase portal content of a promoter referenced link promotion. If so, manager system 110 can proceed to block 1504 and decrement a counter associated with the promoter referenced link promotion. For example, when a promoter referenced link promotion is distributed to a promoter user for use, it may have an associated limited number of counts therewith, each corresponding to a new purchase event before the promoter referenced link promotion expires. In one use case, a distributed promoter referenced link promotion can be a one-time promotion that expires based on a single purchase transaction. Thus, decrementing a counter at block 1504 can result in deactivating a promoter referenced link promotion. At block 1506, manager system 110 can perform examining of relationship graph 700 to determine if any other users are owed an attribution in view of their interactions in reference to a posting of the promoter referenced link promotion. If manager system 110 at block 1510 determines that no other user is owed an attribution, manager system 110 can proceed to block 1512 to perform processing of the promoter referenced link promotion according to the normal course, in which the promoter receives the full attribution and an associated allocation of credit. If on the other hand, manager system 110 determines at block 1510 that one or more other users is owed an attribution and an allocation, manager system 110 can proceed to block 1530 to determine the parameters of the attribution.

In one embodiment, processing performed by manager system 110 in reference to the flowchart of FIG. 8 can be restricted to processing of purchase transactions initiated using purchase portal content within the domain of social media system 140, according to a promotional program based on an agreement between users such as subscriber users of manager system 110 and/or social media system 140 and/or enterprise system 150. Such restricting can be beneficial for a variety of reasons, including for the reason that such restricting facilitates lighter weight machine logic and simplified processing. At the same time, the compatibility of the processing performed by manager system 110 with a promoter referenced link promotion can provide numerous advantages. System 100 can be configured so that notwithstanding the processing described in reference to the flowchart of FIG. 8 being restricted in one embodiment to performing referral credit attributions for purchase transactions initiated using purchase portal content accessed within the domain of social media system 140, a promoter referenced link promotion can be distributed by a promoter outside of social media system 140, e.g. can be used with an external social media system or in an outlet outside of any social media system such as via personal messaging system, e.g. a personal email account or text message service.

Referring again to the processing depicted in the flowchart of FIG. 8, manager system 110 at block 1502 on the determination that posted content is generic promotional posted content can proceed to block 1524 to examine a relationship graph, e.g. a relationship graph according to relationship graph 700 (FIG. 7). At block 1524, manager system 110 can examine relationship graph 700 and determine whether there is a promoter referenced link promotion referenced in relationship graph 700. For example, in the depicted scenario of Table 3, Ann may have posted a promoter referenced link promotion, but Barry might have later initiated a purchase transaction using purchase portal content other than purchase portal content of Ann's promoter referenced link promotion.

At block 1526, manager system 110 can determine whether there is a promoter referenced link promotion specified in relationship graph 700. Based on identification of a promoter referenced link promotion in relationship graph 700, manager system 110 can proceed to block 1528 to decrement the promoter referenced link promotion. Decrementing at block 1528 can result in deactivation of the promoter referenced link promotion, e.g. in the case of a single shot of a single purchase type promoter referenced link promotion or in the case the counter has reached zero (0). At block 1530, manager system 110 can perform an allocation, e.g. as described herein and with respect to the exemplary decision logic data structure of Table 1 and the examples described in reference to Tables 2 and 3.

On completion at block 1106, manager system 110 can return to block 1104 to wait for notification of another purchase transaction for which manager system 110 has iteratively established a relationship graph specifying attributes of interactions by users with respect to promotional content promoting a product subject to purchase transaction initiation.

The exemplary decision data structure as set forth in Table 1 has specific scoring value parameters and weight value parameters, e.g. involving the scaling function depending on node distance. In one embodiment, manager system 110 can run machine learning process 117 to iteratively update the decision data structure such as the decision data structure of Table 1 by machine learning. In one embodiment, manager system 110 can monitor performance of current logic for determining a referral credit attribution. Performance can be monitored based on one or more criterion, e.g. total dollar amount of sales, number of sold units, total number of promotional content post views, and the like. Manager system 110 running machine learning process 117 in one embodiment can iteratively examine performance of manager system 110 across a distribution of instances, wherein each instance employs differently configured decision data structure (e.g. having differentiated scoring values and or weight values) for driving an attribution decision. Manager system 110 can be running a plurality of instances of blocks 1102-1105 for a plurality of post having product promotional content concurrently or successively. For each instance, manager system 110 can change values of scoring value parameters and/or weight value parameters e.g. as shown in Table 1 within valid ranges to facilitate searching of optimum values and manager system 110 by running machine learning process 117 can update the parameter values over the time so that the parameter values over time (as more sample data is accrued) converge on values that are optimally performing values. Based on a result of monitoring of different instances over time, manager system 110 running machine learning process 117 can bias the variety of the decision data structures employed, so that the decision data structures of decision data structures area 2103 assume the characteristics of the most successfully performing iterations.

Certain embodiments herein may offer various technical computing advantages involving computer advantages to address problems arising in the realm of computer networks. Embodiments herein can feature for example advanced data structuring processes such as a data structuring process providing establishing a relationship graph that specifies user interactions in respect to promotional content for use in performing allocations involving digital rights. Relationship graph data structures can facilitate lightweight higher speed processing while reducing storage requirements. Various decision data structures can be used to drive artificial intelligence (AI) decision making, such as a decision data structure that cognitively maps social media interactions in relation to posted content in respect to parameters for use in performing allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. employing Natural Language Processing (NLP) and relationship graph processing for transforming unstructured data into a form optimized for computerized processing. Embodiments herein can provide results and advantages that are not possible or practical without use of components of a technical computing environment, such as processes leveraging instantaneous queries of a data repository storing user behavior history data to develop multifactor determinations. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Figure 9:
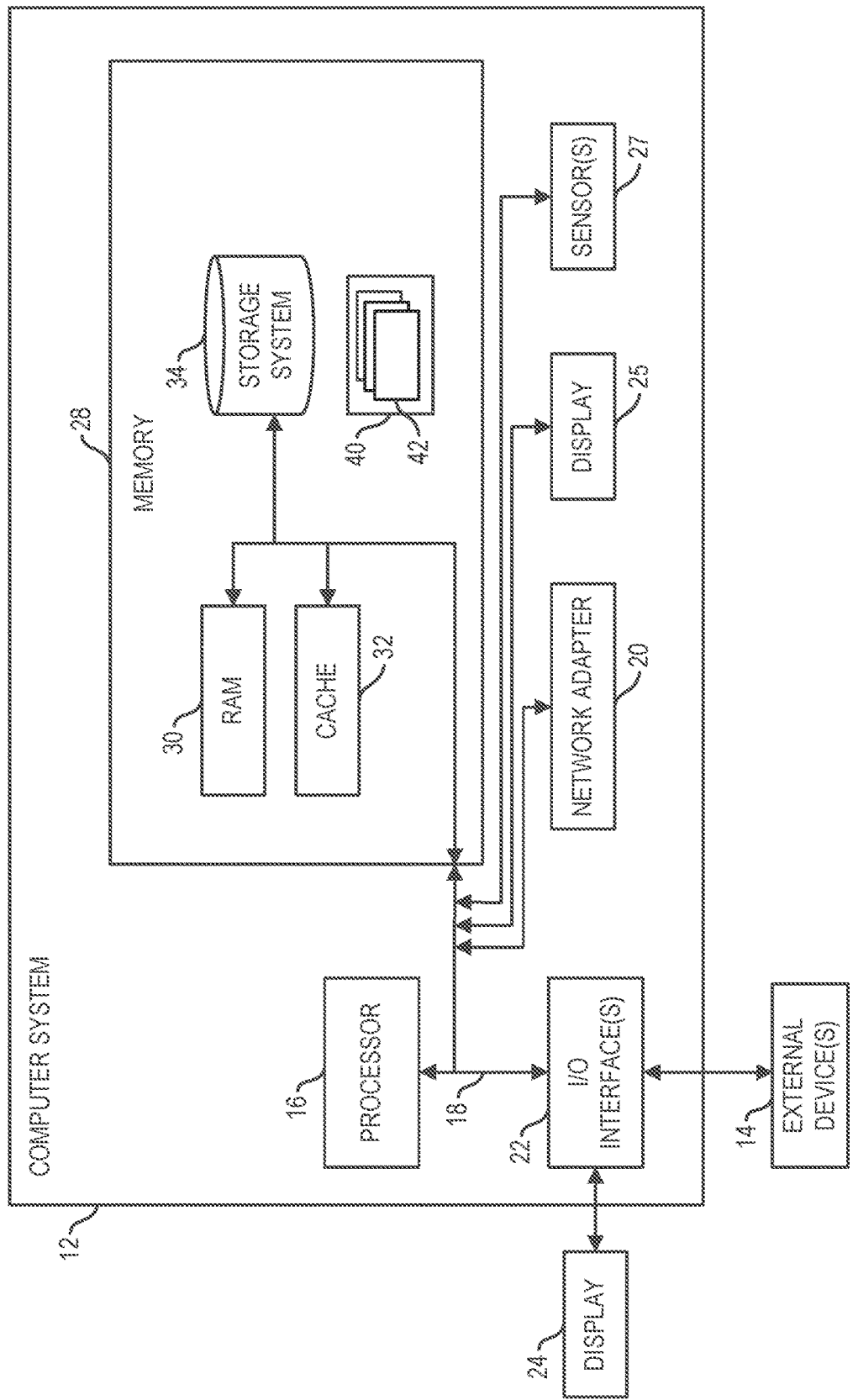
FIG. 9 depicts a computing node according to one embodiment.
Figure 10:
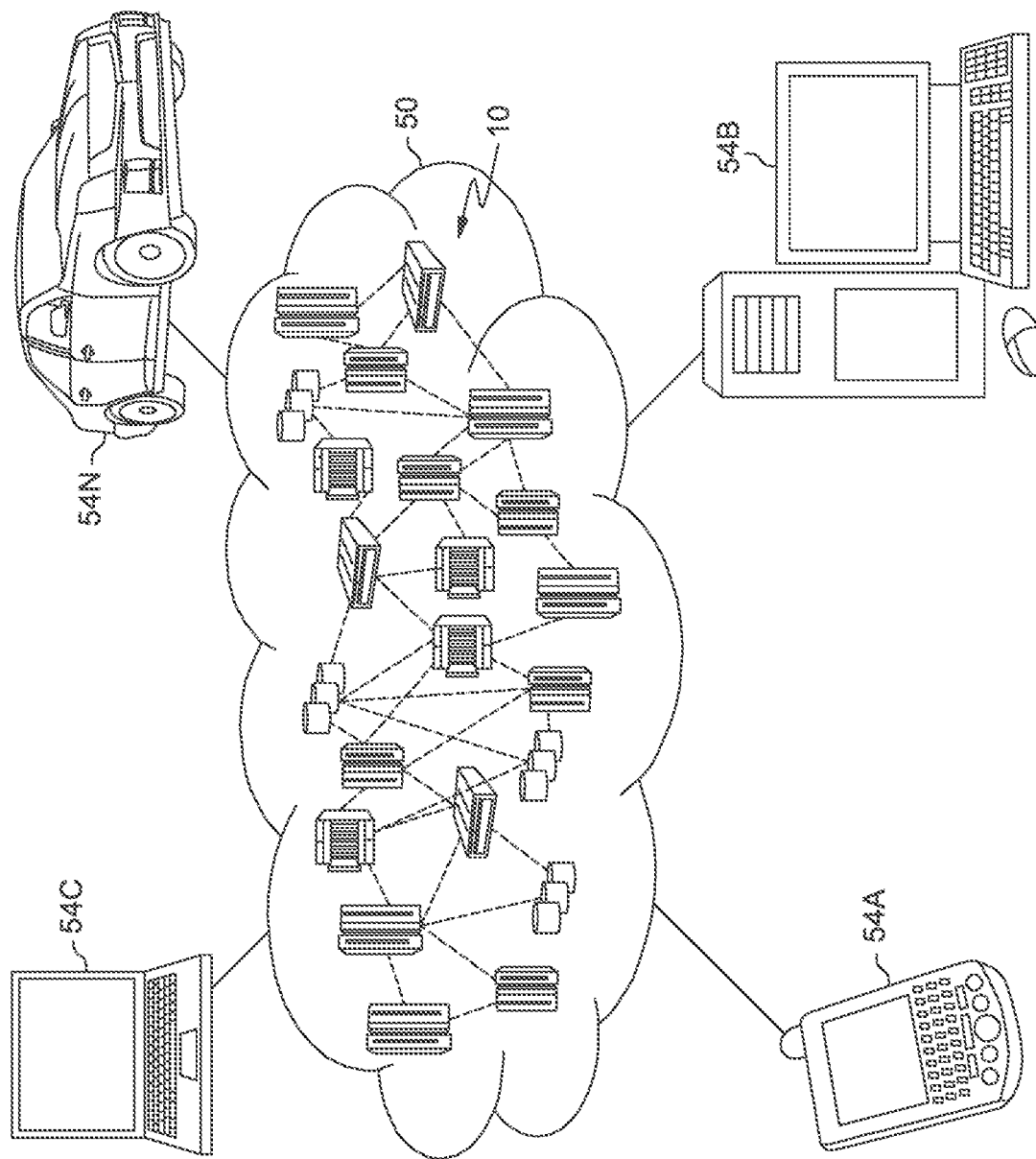
FIG. 10 depicts a cloud computing environment according to one embodiment.
Figure 11:
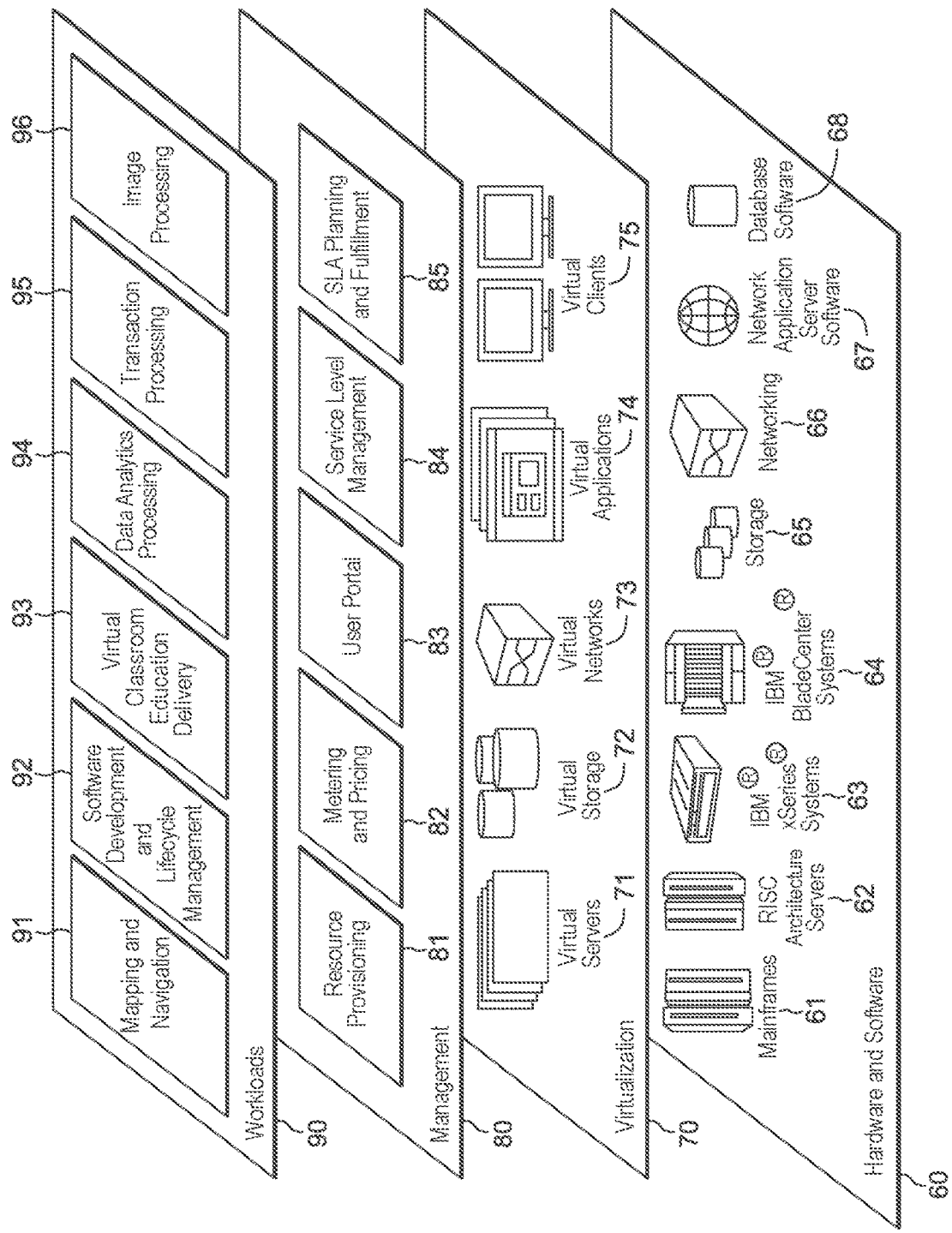
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 3 and functions described with reference to method 300 of FIG. 3 and functions described with reference to manager system 110 as set forth in the flowchart of FIG. 4. In one embodiment, one or more user computer device 130A-130Z can include one or more computing node 10 and can include one or more program 40 for performing functions described with reference to one or more user computer device 130A-130E as set forth in the flowchart of FIG. 4. In one embodiment, social media system 140 can include one or more computing node 10 and can include one or more program 40 for performing functions described with reference to social media system 140 as set forth in the flowchart of FIG. 4. In one embodiment, enterprise system 150 can include one or more computing node 10 and can include one or more program 40 for performing functions described with reference to one or more user enterprise system 150 as set forth in the flowchart of FIG. 4. In one embodiment, the computing node based systems and devices set forth in FIG. 1 can include one or more program 40 for performing functions that are described with reference to the respective computing node based devices and systems.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 7 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing referral credit allocation as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    processing interactions data of a plurality of users to establish a relationship graph, wherein the relationship graph is configured to reduce data storage requirements for increased data acquisition and processing speeds;
    examining, by machine logic, interactions data specifying attributes of interactions with posted social media promotional content promoting a product, wherein the product is subject to an initiated purchase transaction, and wherein the interactions include interactions by the plurality of users, wherein the examining, by machine logic, interactions data specifying attributes of interactions with posted social media promotional content promoting a product includes examining data of the established relationship graph;

attributing, by machine logic, referral credit for the purchase transaction to users of the plurality of users based on the examining; and
providing one or more output based on the attributing.

2. The method of claim 1, wherein the examining, by machine logic, interactions data specifying attributes of interactions with posted social media promotional content promoting a product includes ascertaining whether the posted social media promotional content belongs to a first classification of promoter referenced link promotion and wherein the examining, by machine logic, includes ascertaining whether the posted social media promotional content belongs to a second classification of not a promoter referenced link promotion, wherein the method includes performing a first attribution process based on a classifying into the first classification and performing a second attribution process based on a classifying into a second attribution process.

3. The method of claim 1, wherein the examining, by machine logic, interactions data specifying attributes of interactions with posted social media promotional content promoting a product includes examining data of an established relationship graph, and wherein the examining includes processing interactions data of the plurality of users to establish the relationship graph, wherein the established relationship graph has post nodes that reference posts of promotional content of users, user nodes that reference users and edges that specify interactions of users with respect to posts referenced in the post nodes.

4. The method of claim 1, wherein the examining, by machine logic, interactions data specifying attributes of interactions with posted social media promotional content promoting a product includes examining data of an established relationship graph, and wherein the examining includes processing interactions data of the plurality of users to establish the relationship graph, wherein the established relationship graph has post nodes that reference posts of promotional content of users, user nodes that reference users and edges that specify interactions of users with respect to posts referenced in the post nodes, wherein the interactions include one or more of original posting, viewing, and sharing posted social media promotional content promoting a product.

5. The method of claim 1, wherein the examining, by machine logic, interactions data specifying attributes of interactions with posted social media promotional content promoting a product includes determining whether a certain user liked or shared the posted social media promotional content promoting a product, and wherein the attributing includes attributing to the certain user a first contribution indicating score to the purchase transaction based on a determining that the certain user liked the posted social media promotional content and attributing to the certain user a second contribution indicating score to the purchase transaction based on a determining that the certain user liked the posted social media promotional content.

6. The method of claim 1, wherein the examining, by machine logic, interactions data specifying attributes of interactions with posted social media promotional content promoting a product includes examining data of an established relationship graph, and wherein the examining includes processing interactions data of the plurality of users to establish the relationship graph, wherein the established relationship graph has post nodes that reference posts of promotional content of users, user nodes that reference users and edges that specify actions of users with respect to posts referenced in the post nodes, wherein the relationship graph includes information of a post node distance of a user's interaction with the posted social media promotional content promoting a product relative to a primary node with reference to which the initiated purchase transaction is made and wherein the attributing includes scaling a certain user's contribution to the initiated purchase transaction based on a post node distance of the user's interactions with the posted social media promotional content promoting a product relative to the primary post node.

7. The method of claim 1, wherein attributing, by machine logic, includes using a decision data structure that maps interactions of users to parameter values for use in scoring a user's contribution to a purchase transaction, wherein in the attributing includes scoring a contribution to the purchase transaction of the plurality of users using the decision data structure.

8. The method of claim 1, wherein attributing, by machine logic, includes using a decision data structure that maps interactions to scoring values for use in scoring a user's contribution to a purchase transaction, wherein in the attributing includes scoring a contribution to the purchase transaction of the plurality of users using the decision data structure, wherein the method includes monitoring a performance of instances of decision data structures according to the decision data structure, the instances having parameter values varying from parameter values of the decision data structure and updating a subsequent decision data structure according to the decision data structure by machine learning based on the monitoring.

9. The method of claim 1, wherein the one or more output includes one or more output to perform an allocation of digital rights amongst users of the plurality of users based on the attributing, and wherein the one or more output includes a notification to a user of the plurality of users specifying the allocation of digital rights.

10. The method of claim 1, wherein the one or more output includes one or more output to increase a monetary account balance of users of the plurality of users based on the attributing, and wherein the one or more output includes a notification to users of the plurality of users specifying the monetary account balance increases.

11. The method of claim 1, social media promotional content promoting a product is a promoter referenced link promotion, wherein the examining, by machine logic, interactions data specifying attributes of interactions with posted social media promotional content promoting a product includes ascertaining whether the posted social media promotional content belongs to a first classification of a promoter referenced link promotion, wherein the method includes one or more decrementing or deactivating the promoter referenced link promotion based on a classifying the social media promotional content as a promoter referenced link promotion.

12. The method of claim 1, wherein the attributing, by machine logic, includes attributing to a certain user a first contribution indicating score to the purchase transaction based on a determining that purchase portal content of a post of the certain user was used to initiate the purchase transaction, and attributing to a certain user a second contribution indicating score to the purchase transaction based on a determining that purchase portal content of the post of the certain user was not used to initiate the purchase transaction, wherein the second contribution indicating score is lower than the first contribution indicating score.

13. A computer program product comprising:
a computer readable storage medium readable by one or more processing unit and storing instructions for execution by one or more processor for performing a method comprising:
processing interactions data of a plurality of users to establish a relationship graph, wherein the relationship graph is configured to reduce data storage requirements for increased data acquisition and processing speeds;
examining, by machine logic, interactions data specifying attributes of interactions with posted social media promotional content promoting a product, wherein the product is subject to an initiated purchase transaction, and wherein the interactions include interactions by the plurality of users, wherein the examining, by machine logic, interactions data specifying attributes of interactions with posted social media promotional content promoting a product includes examining data of the established relationship graph;
attributing, by machine logic, referral credit for the purchase transaction to users of the plurality of users based on the examining; and
providing one or more output based on the attributing.

14. The computer program product of claim 13, wherein the examining, by machine logic, interactions data specifying attributes of interactions with posted social media promotional content promoting a product includes ascertaining whether the posted social media promotional content belongs to a first classification of promoter referenced link promotion and wherein the examining, by machine logic, includes ascertaining whether the posted social media promotional content belongs to a second classification of not a promoter referenced link promotion, wherein the method includes performing a first attribution process based on a classifying into the first classification and performing a second attribution process based on a classifying into a second attribution process.

15. The computer program product of claim 13, wherein the examining, by machine logic, interactions data specifying attributes of interactions with posted social media promotional content promoting a product includes examining data of an established relationship graph, and wherein the examining includes processing interactions data of the plurality of users to establish the relationship graph, wherein the established relationship graph has post nodes that reference posts of promotional content of users, user nodes that reference users and edges that specify interactions of users with respect to posts referenced in the post nodes.

16. A system comprising:
a memory;
at least one processor in communication with the memory; and
program instructions executable by one or more processor via the memory to perform a method comprising:
processing interactions data of a plurality of users to establish a relationship graph, wherein the relationship graph is configured to reduce data storage requirements for increased data acquisition and processing speeds;
examining, by machine logic, interactions data specifying attributes of interactions with posted social media promotional content promoting a product, wherein the product is subject to an initiated purchase transaction, and wherein the interactions include interactions by the plurality of users, wherein the examining, by machine logic, interactions data specifying attributes of interactions with posted social media promotional content promoting a product includes examining data of the established relationship graph;
attributing, by machine logic, referral credit for the purchase transaction to users of the plurality of users based on the examining; and
providing one or more output based on the attributing.

17. The system of claim 16, wherein the examining, by machine logic, interactions data specifying attributes of interactions with posted social media promotional content promoting a product includes examining data of an established relationship graph, and wherein the examining includes processing interactions data of the plurality of users to establish the relationship graph, wherein the established relationship graph has post nodes that reference posts of promotional content of users, user nodes that reference users and edges that specify actions of users with respect to posts referenced in the post nodes, wherein the relationship graph includes information of a post node distance of a user's interaction with the posted social media promotional content promoting a product relative to a primary node with reference to which the initiated purchase transaction is made and wherein the attributing includes scaling a certain user's contribution to the initiated purchase transaction based on a post node distance of the user's interactions with the posted social media promotional content promoting a product relative to the primary post node.

18. The system of claim 16, wherein attributing, by machine logic, includes using a decision data structure that maps interactions to parameter values for use in scoring a user's contribution to a purchase transaction, wherein in the attributing includes scoring a contribution to the purchase transaction of the plurality of users using the decision data structure, wherein the method includes monitoring a performance of instances of decision data structures according to the decision data structure, the instances having parameter values varying from parameter values of the decision data structure and updating a subsequent decision data structure according to the decision data structure by machine learning based on the monitoring.

19. The method of claim 1, wherein the established relationship graph has post nodes that reference posts of promotional content of users.

20. The system of claim 16, wherein the established relationship graph has post nodes that reference posts of promotional content of users.

* * * * *